C. E. ABBOTT.
Lamp Extinguisher.
No. 80,796.
Patented Aug. 11, 1868.
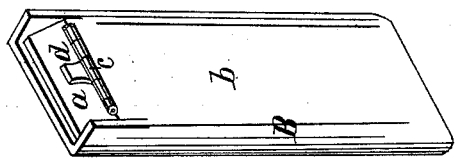
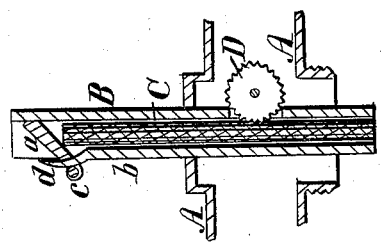
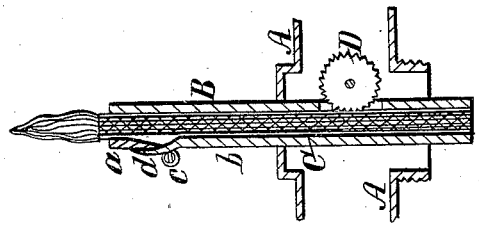
Witnesses:
Geo Morrill
N. W. Stearns
Inventor.
Charles E. Abbott

United States Patent Office.

CHARLES E. ABBOTT, OF MALDEN, MASSACHUSETTS.

Letters Patent No. 80,796, dated August 11, 1868.

IMPROVEMENT IN EXTINGUISHERS FOR LAMPS.

The Schedule referred to in these Letters Patent and making part of the same.

TO ALL WHOM IT MAY CONCERN:

Be it known that I, CHARLES E. ABBOTT, of Malden, in the county of Middlesex, and State of Massachusetts, have invented certain Improvements in Extinguishers for Lamps, of which the following is a full, clear, and exact description, reference being had to the accompanying drawings, making part of this specification, in which—

Figure 1 is a vertical section through a wick-tube, with my improved extinguisher applied thereto, the wick being raised into the position it occupies when lighted.

Figure 2 is a vertical section through the same, the wick being lowered, and the extinguisher closed over its top.

Figure 3 is a perspective view of my extinguisher applied to a wick-tube.

My invention has for its object to provide a simple and ready means of extinguishing the flame of lamps, without creating the smoke and disagreeable odor which attend the ordinary method of extinguishing the flame; and my invention consists in a wick-tube, so formed that the upper portion of one of its sides will close over the wick as soon as it is lowered below the top of the tube.

To enable others skilled in the art to understand and use my invention, I will proceed to describe the manner in which I have carried it out.

In the said drawings, A represents the upper part of a burner of an ordinary kerosene-lamp, through which passes the tube B, for the reception of the wick C, which is raised and lowered, as required, by a toothed wheel, D, in a well-known manner.

One side of the wick-tube is made in two pieces, $a$ $b$; the upper portion or lid, $a$, being hinged or pivoted at $c$ to the lower or main portion, $b$, which is provided with a stop, $d$, against which the upper portion, $a$, is pressed and retained by the wick when raised in a position to be lighted, (see fig. 1.) Immediately on lowering the wick, the upper portion or lid being inclined inward, and having nothing to support it, drops over by its gravity, and encloses the top of the wick, thereby extinguishing the light, and preventing the smoke and unpleasant odor from arising, and also preventing the evaporation of the oil.

I prefer to make the lid $a$ thicker at its top than at its bottom, which is rounded off to a point, as seen in figs. 1 and 2, as by this construction the top of the lid will be heavier, and will therefore more rapidly fall forward over the top of the wick; and this result is rendered more certain from the fact that the hinge or point at which it is pivoted is placed entirely on the outer surface of the tube.

In order to still further assist the fall of the lid, as required, the stop $d$, instead of being made rigid, may be made flexible, and serve as a spring, without departing from the spirit of my invention.

Claim.

What I claim as my invention, and desire to secure by Letters Patent, is—

The lid $a$, so hinged and supported that when the wick C is lowered, the lid will fall over it and close the mouth of the wick-tube B, substantially as set forth.

CHARLES E. ABBOTT.

Witnesses:
N. W. STEARNS,
GEO. MORRILL.